United States Patent
Baur et al.

(10) Patent No.: US 7,085,649 B2
(45) Date of Patent: Aug. 1, 2006

(54) ELECTRONIC ORGANIZER

(75) Inventors: Reinhold Baur, Neu-Ulm (DE); Tero Valtonen, Salo (FI); Turkka Keinonen, Huhmarl (FI); Anne Koppinen, Tampere (FI); Anne Kirjavainen, Espoo (FI); Maximiliano Roque-Cerna, Gunzburg (DE); Karsten Lehn, Kamen (DE); Markus Pazina, Bochum (DE); Wofgang Theimer, Bochum (DE); Klaus Kespohl, Bochum (DE); Peter Buth, Bochum (DE); Cordula Conrady, Rheinberg (DE); Stephan Rastuttis, Cologne (DE); Thomas Fuhrmann, Dulmen/Bulden (DE); Minna Asikainen, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 602 days.

(21) Appl. No.: 09/875,653

(22) Filed: Jun. 6, 2001

(65) Prior Publication Data

US 2002/0030698 A1    Mar. 14, 2002

(30) Foreign Application Priority Data

Jun. 9, 2000   (DE) ................................. 100 28 659

(51) Int. Cl.
*G01C 21/30*    (2006.01)
(52) U.S. Cl. ...................... 701/209; 701/201; 701/202; 340/995.19
(58) Field of Classification Search ............... 455/557, 455/419, 41.2, 556.2, 556.1, 404.2, 456.1, 455/456.2, 456.3, 456.4, 456.5, 456.6, 457; 701/201–202, 204, 209, 210; 342/357.13; 340/995.19, 995.24

See application file for complete search history.

(56) References Cited

U.S. PATENT DOCUMENTS

| 5,654,908 | A | * | 8/1997 | Yokoyama | ................... 708/109 |
| 5,729,731 | A | | 3/1998 | Yajima et al. | ............... 395/603 |
| 5,790,974 | A | | 8/1998 | Tognazzini | .................. 701/204 |
| 5,825,360 | A | | 10/1998 | Odam et al. | ................. 345/344 |
| 6,285,950 | B1 | * | 9/2001 | Tanimoto | ..................... 701/201 |
| 6,622,083 | B1 | * | 9/2003 | Knockeart et al. | ........... 701/202 |
| 6,658,268 | B1 | * | 12/2003 | Bodnar et al. | ............ 455/556.2 |
| 6,691,173 | B1 | * | 2/2004 | Morris et al. | ................ 709/249 |
| 2002/0022453 | A1 | * | 2/2002 | Balog et al. | ................... 455/41 |

FOREIGN PATENT DOCUMENTS

| DE | EP0697580 A1 | 8/1995 |
| DE | 4429121 C1 | 2/1996 |
| DE | 19747879 A1 | 4/1999 |

(Continued)

*Primary Examiner*—Edward F. Urban
*Assistant Examiner*—Raymond S. Dean
(74) *Attorney, Agent, or Firm*—Perman & Green, LLP.

(57) ABSTRACT

Electronic organiser (10) with a calendar (11) in which appointments at least according to date, time and an individual description, for example a person to be visited, are variable. If the organiser (10) is provided with an interface (22) which can exchange data in respect of the appointments with an interface (22) existing on another device (21), the data recorded in the calendar (11) can be used to run the other device or the electronic organiser (10) can be controlled by the other device. Thus for example data recorded in the calendar (11) can be used by a navigation system for faster input of the destination, or for example departure appointments can be changed by the other device according to the traffic or other situations.

20 Claims, 2 Drawing Sheets

FOREIGN PATENT DOCUMENTS

Figure 1:
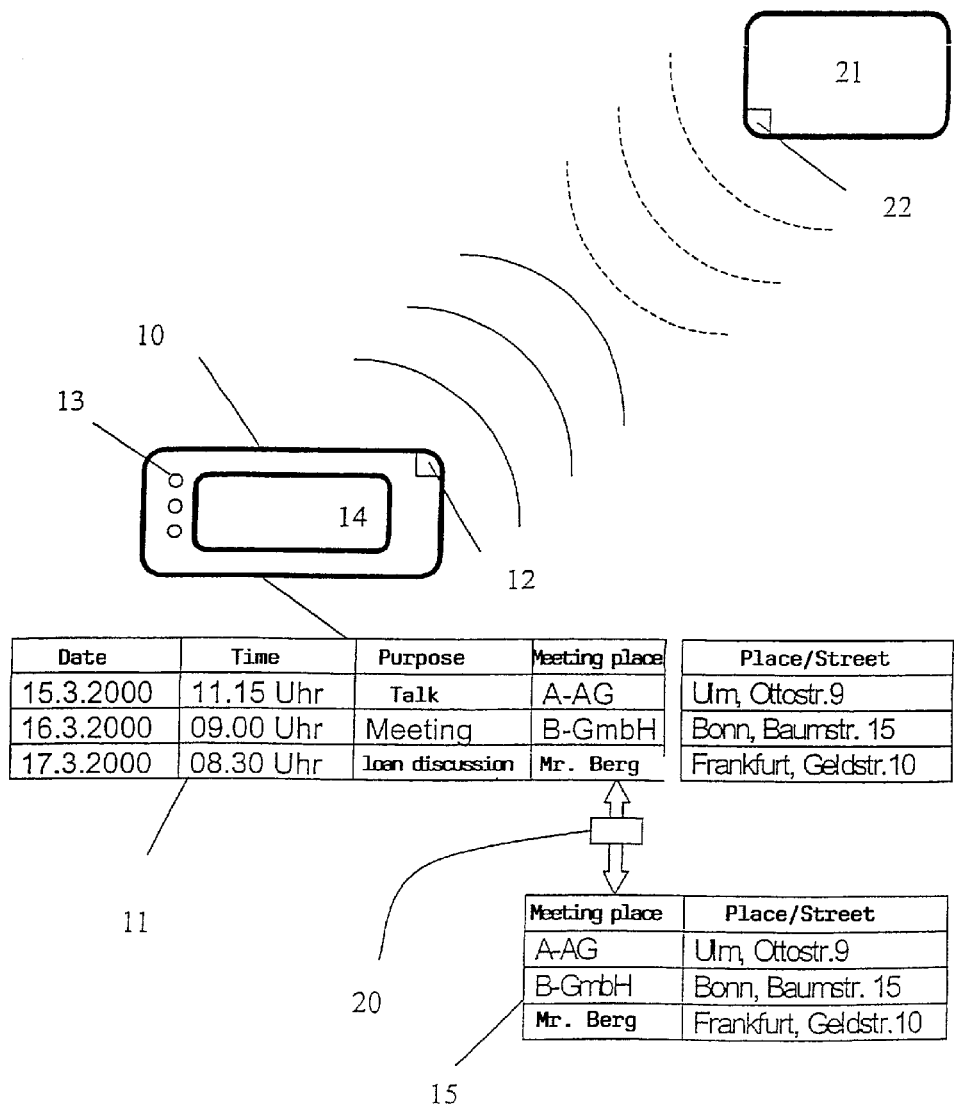

| | | |
|---|---|---|
| DE | 19840484 A1 | 3/2000 |
| DE | 19917169 A1 | 11/2000 |
| DE | 19927280 A1 | 1/2001 |
| EP | 0696774 A2 | 6/1995 |
| EP | 0795835 A1 | 12/1995 |
| EP | 0797164 A1 | 2/1997 |
| EP | 1087316 A2 | 9/2000 |
| WO | WO00/73952 A1 | 12/2000 |

* cited by examiner

ELECTRONIC ORGANIZER

The invention concerns an electronic organiser according to the introductory part of patent claim 1.

In the state of the art, electronic organisers which serve to organise private and/or professional everyday life are already known. These organisers are distinguished in that they have a plurality of different columns in which the different data filed for an appointment are stored and indicated to the user later. According to a minimal configuration, for example, date, time and name columns may be provided. As a general rule, the organisers are also designed in such a way that for example double booking of periods is prevented.

It is the object of the invention to develop an electronic organiser of the kind mentioned hereinbefore in such a way that communication between it and another device is possible.

The solution for achieving the set object is provided in the characterising part of patent claim 1. Advantageous embodiments of the invention are to be found in the subsidiary claims.

An electronic organiser according to the invention is distinguished in that it is provided with an interface which can exchange data in respect of the appointment data with an interface existing on another device.

With the electronic organiser it is thus possible for the appointment data stored in its calendar to be used to run another device, or for the electronic organiser to be controlled by the other device. For this purpose it is provided that bidirectional data exchange can be set up between the electronic organiser and the other device.

According to a very advantageous embodiment of the invention, the other device is a navigation device, wherein in the other device the data filed in the calendar can be used to determine the route.

In the state of the art, navigation assemblies for routing are already known. Irrespective of how the known navigation systems are organised, for routing it is necessary for the respective destination data to be imparted in some manner to the navigation system so that the latter, starting from the respective location, can determine and output the route to the destination. In order to carry out entry of the destination in a conventional manner, manual switching means which are in dialogue with a screen for the input of destination data are used almost exclusively. Attention is drawn to DE-A 199 27 280 and U.S. Pat. No. 5,825,360 as representative of such assemblies.

Assemblies which have a voice detection assembly and in which destination data detection is voice-controlled are also known. Apart from the fact that voice-controlled systems currently still require high expenditure to obtain useful results, both manual and voice-controlled systems have the drawback that, for input of the destination, relatively extensive work is still required of the user. According to the invention it is now possible to reduce the input of destination data into the navigation system to an unavoidable amount by automation. The data once entered for an appointment, that is, the location-related appointment data, can now be transmitted directly from the electronic organiser to the navigation system via the interfaces without extensive input treatment being necessary. The navigation system can therefore in a simple manner use the data filed in the calendar in determining the route to fix the destination or appointment location, by for example transferring the address of the appointment location to the navigation system.

There is very convenient handling if there is a file or address file in which the associated destination location or the associated address is deposited under the respective individual description and there is a matching assembly which, with the aid of the individual description recorded in the calendar, ascertains the associated destination location or the associated address from the file. If again a name and/or a telephone number is used as the individual description, very user-friendly operation is achieved.

On the other hand with the electronic organiser it is possible to control it by the other device via the interfaces. If for instance the electronic organiser on the basis of stored appointments contains so-called preliminary appointments when a departure would be desirable in order to be able to keep the actual appointment with respect to the travelling time, then these preliminary appointments could be altered by the other device, this being with respect to events which might alter the travelling time. These events would be, for example, weather-related events, congestion, diversions, etc. The other device in this case could be a service provider which reports continually on such events.

Communication between the interfaces of the electronic organiser and the other device can be via various suitable channels, for instance via the internet, via radio channels or wire-bound channels, and the like.

Advantageously here the electronic organiser and the other device can also form a transportable unit. This unit could be added to, forming a mobile telephone.

Figure 2:
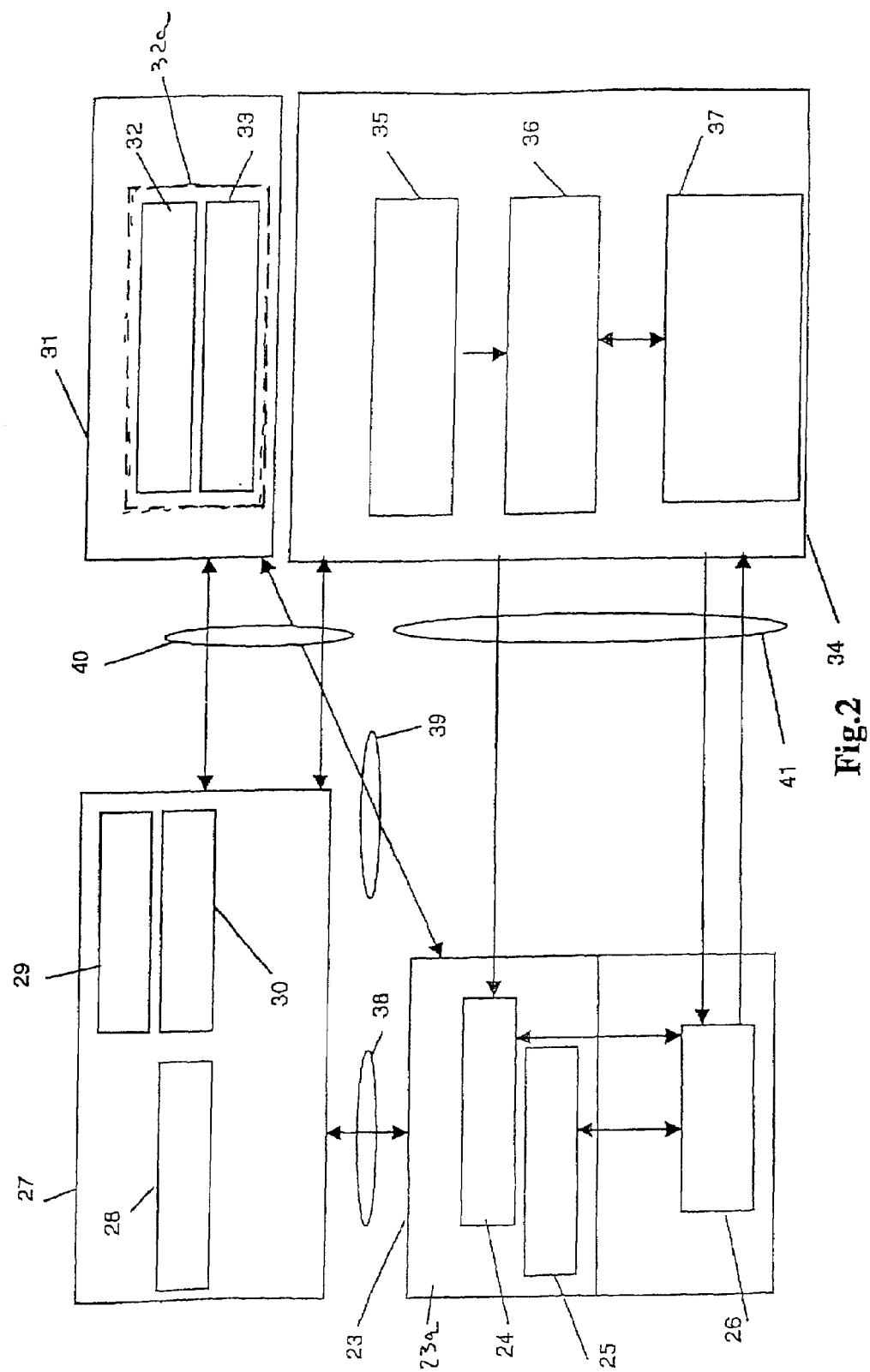

The invention is described in more detail below with reference to the drawings. They show:

FIG. 1 an electronic organiser which is in communication with another electronic device via an air interface; and FIG. 2 electronic organisers according to the invention in different embodiments, which can be connected by different interfaces and also by the internet to each other and to a service provider.

In FIG. 1 an organiser is shown with the reference number 10. This organiser 10 includes, apart from a calendar 11, an interface 12. To show the conditions better, in FIG. 1 the calendar 11 is illustrated in an enlarged form below the organiser 10. It can be seen clearly from the drawing of the calendar 11 that in the present case the latter has four columns (date, time, purpose and meeting place) and has a plurality of rows, of which however only four are shown and already have appointments or appointment details written in. Only for the sake of completeness it should be pointed out that in the embodiment shown the "meeting place" column serves to contain individual descriptions in the sense of this application.

The organiser can, for example, form part of a mobile communication device (mobile telephone). By way of example the NOKIA®9110 communicator or the NOKIA 6210 mobile telephone, which have the capacity to manage calendar entries, might be mentioned here.

The entry of a new appointment is presently organised in such a way that, on actuation of a corresponding function button 13 on the organiser 10, an empty row on the display 14 of the organiser 10 is made available to the user, which he must then fill in with data for his appointment according to the headings of the columns. To enter the appointment which is shown in the first row shown in the figure, via a keyboard (not shown) the user would have had to make an entry of 15.3.2000 in the first column, an entry of 11.15 in the second column, an entry of "talk" in the third column and an entry of "A-AG" in the fourth column. It is striking that, apart from the entries just mentioned, no indication of address is required of the user. Instead, the address is added beside the respective appointment entry due to the fact that there is an address file 15 in the organiser 10, which is linked to the calendar 11 through the meeting place column and has a matching assembly 20. The link is shown with the double arrow in the figure. Because of this link, on entering the respective meeting place the address relevant to this entry is found in the address file 15 and connected with the respective appointment. For the appointment entered in the first row in FIG. 1 this means that, with reference to the entry "A-AG" made in the meeting place column, the associated address "Ulm, Ottostrasse 9" is found in the address file 15 which is also provided with a meeting place column for this purpose, and connected with the row entry in the calendar 11. Whether the exact address ascertained with reference to the meeting place is indicated in the calendar 11 or not, is of no importance to the manner of operation of the invention. If however it is indicated, this can be an advantage to the user. If for example A-AG has several branches the user can, if the addresses of the branches are indicated to him, with the entry simultaneously select the address of the branch of A-AG which is relevant to his appointment.

Only for the sake of completeness it should be pointed out that the calendar 11 does not necessarily have to be connected with the address file 15 via the meeting place column. Instead, in another embodiment not shown the respective address from the address file 15 can be linked via a telephone number recorded in the calendar 11 or a person's name, if suitable columns are provided instead of the meeting place columns in the calendar 11 and address file 15.

Also, in a simple embodiment, not shown, an address file 15 can be completely dispensed with if the calendar 11 for example has the place and street columns. In this case, however, it is necessary for the user also to enter the address of the appointment location according to place and street in the calendar 11, to fix the appointment.

When a user has made the entries shown in FIG. 1, the respective entries are transmitted to the navigation assembly 21. For this purpose the organiser 10 is provided with an interface 12 via which it can exchange data with the navigation assembly 21, which also has an interface 22.

Even though, in the embodiment shown in FIG. 1, data exchange between the organiser 10 and the navigation assembly 21 takes place via an air gap, in another embodiment, not shown, data exchange can take place through cables. If the latter is done, then a physical connection must simply be made between the organiser 10 and the navigation assembly 21 for data exchange, by for example connecting the organiser 10 to the navigation assembly 21 by a cable.

The data exchange shown in FIG. 1 and occurring via an air gap can be achieved in such a way that both the organiser 10 and the navigation assembly 21 have a GSM module (not shown). Data exchange between the organiser 10 and the navigation assembly 21 can be organised in such a way that recorded appointments are transmitted to the navigation device 21 at fixed or variable intervals of time. Since data transmission at intervals is not only costly, but also requires transmission capacities, it may be provided that data transmission takes place only when a new appointment has been entered in the organiser 10.

But data transmission between the organiser 10 and the navigation device 21 can also be achieved by a cable link or by a short-range wireless radio link (for example by the Bluetooth Standard).

If the data of the calendar 11 according to FIG. 1 have been transmitted from the organiser 10 to the navigation assembly 21, and if the user then starts his vehicle in which the navigation assembly 21 is installed on 15.3.2000 at 8.30 a.m., he is given the instruction that at 11.15 a.m. there will be a talk at A-AG in Ottostrasse 9 in Ulm. At the same time as the instruction, the user is asked the question whether routing to this appointment is to be done. If the user answers in the affirmative, he is given the route starting from the current location to Ottostrasse 9 in Ulm.

But if the user were to use his vehicle already on 14.3.2000 at around 4.00 p.m., this would mean that in this case he would be given the instruction and the question as in the last paragraph. To avoid such superfluous instructions and questions well in advance of an appointment, the following may be provided:

If, with the aid of the instantaneous date and time values, it is established that the next appointment is outside a variable or fixed time slot, output of the instruction and question is suppressed. If for example the time slot is four hours ahead, the instruction for the appointment on 15.3.2000 at 11.15 a.m. and the associated question regarding routing to the appointment are not triggered until the vehicle is started after 7.15 a.m. on 15.3.2000. Consequently, in case of a time of use according to the details in the last paragraph, the instruction for the appointment and the question regarding routing would be suppressed.

Also it may be provided that vehicles which have been set in operation outside the time slot or in which the routing question was rejected before starting the journey, always receive the instruction and the routing question if, during the ongoing journey, the instantaneous date and time values plus the value for the time slot corresponds to the time of the next appointment.

It is substantially more advantageous than using the variable or fixed time slot if the time slot is ascertained dynamically. If it is assumed that the instantaneous location of the vehicle is known or at least can easily be ascertained by the usual position finding modules in navigation assemblies 21, the required travelling time can be determined from this value and the indication of destination for the corresponding appointment, by for example evaluating the individual driving behaviour of the user on different types of roads during the past and, by examination of the types of roads to be used and the kilometers to be travelled thereon, using it to determine the time slot. If, for instance, the vehicle is set in operation on 15.3.2000 at 8.00 a.m. in Karlsruhe, and if a time slot of two hours is ascertained for the distance from Karlsruhe to Ulm for the appointment, on starting the journey the user is not given any instruction nor routing question unless, by appropriate settings before starting the journey, he would always like to have such instructions and questions. If the driver uses his vehicle on 15.3.2000 at 7.00 a.m. for a journey to Mannheim and in the process moves away from the appointment destination, he receives, if for example he uses his vehicle again at 8.30 a.m. in Mannheim, the instruction for the appointment at 11.15 a.m. combined with the routing question. The latter is due to the fact that, owing to the journey to Mannheim, the travelling time has increased for example to two hours and so the time slot has increased accordingly. But that the driver receives the instruction and routing question already at 8.30 a.m. and not only at 8.45 a.m., is due to the fact that, at least in case of dynamic ascertainment of the time slot, a safety margin should be included in the ascertained time slot and, on starting up the vehicle within the period of the safety margin, an instruction and routing question are outputted. There is very flexible determination of the safety margin if the safety margin increases for longer distances compared with shorter distances. For the embodiment described above this means that, for the 210 km from Mannheim to Ulm, for example, the safety margin is 20 minutes, so that every time the vehicle is started up between 8.25 a.m. and 9.45 a.m. the instruction and routing question are outputted. For a distance of 550 km and an ascertained travelling time of 6.10 hours, the safety margin could be 45 minutes, for example.

When ascertaining the travelling time it is helpful if the navigation system 21 can also take into consideration any current traffic conditions on the road. The navigation system 21 can get the traffic messages for example through the radio receiver or search from a service provider by an inquiry through a cellular mobile telephone network.

With the aid of FIG. 2 a further embodiment of the invention is described in which calendar and navigation data are prepared and matched via a service provider, for example via an internet link. In FIG. 2 the blocks are given the following reference numbers:

23 mobile communication device (for example mobile telephone)
24 local calendar/mobile telephone
25 local address memory/mobile telephone
26 navigation device
27 internet portal
28 global route memory
29 global calendar
30 global address memory
31 personal computer (PC)
32 local calendar/PC
33 local address memory/PC
34 service provider
35 traffic information memory
36 route calculation unit
37 client data memory
38 radio link (for example GSM mobile telephone nework)
39 mobile telephone—PC link (for example cable, infrared, Bluetooth)
40 internet link (for example land network telephone link)
41 radio link (for example GSM mobile telephone network)

The mobile communication device 23 is, at its simplest, a mobile telephone which contains an electronic organiser 23*a* and a navigation device 26 in communication with the latter. Calendar entries can be stored in a local calendar 24 in the electronic organiser 23*a*. Further, the electronic organiser 23*a* has a local address memory 25 in which the addresses of clients, colleagues or firms can be stored.

The mobile telephone further has a navigation device 26. The navigation device 26 receives calculated routes from a service provider 24 and makes the corresponding navigation instructions (direction arrows) available to the driver on a display during the journey to a destination. But the navigation instructions can also be passed from the mobile telephone 23 inside the vehicle to an external indicator device. Voice output of directional instructions is possible too. But the navigation device could also calculate the routes itself.

The mobile telephone 23 is connected by a GSM radio link (global system for mobile communications) to an internet portal 27. The internet portal 27 can on the one hand make the connection to a personal computer 31 via an internet link 40 or make a connection to a service provider 34. The internet portal 27 contains in certain circumstances a global route memory 28 on which are stored routes which the service provider 34 has made available.

Further, the internet portal 27 contains a global calendar 29 which can be matched with the local calendar 24 of the mobile telephone 23 and the local calendar 32 of the PC 31. Inside the PC 31, the local calendar 32 and a local address memory 33 belong to an additional electronic organiser 32*a* which is there.

Similarly the global address memory 30 of the internet portal 27 can be matched with the local address memory 25 of the mobile telephone 23 and the local address memory 33 of the PC 31.

The mobile telephone 23 and the PC 31 are as a rule in the possession of the user, i.e. he carries the mobile telephone on him, in order always to have calendar and address data on him and keep them up to date. Further, the user has for example in his work place and/or in his home desktops 31 or laptops with which a link to the internet portal 27 can be made via the internet link 40. Further, the PC 31 can receive a link to the mobile telephone 23 via a cable, infrared or radio interface (Bluetooth) 39 and directly match the calendar and address data.

The service provider 34 has a memory for traffic information 35, which continually collects and updates traffic information for example through other service providers or through its own sources. Apart from traffic congestion, for example other information which delays a journey (for example weather conditions) can be filed here.

The service provider 34 further has a route calculation unit. The route calculation unit 36 receives for example calendar entries from the global calendar 29 of the internet portal 27 via an internet connection 40, as soon as a new calendar entry has been stored there. The route calculation unit 36 further has access to the global address memory 30 and from there can ascertain the destination position belonging to a calendar entry. Furthermore at the service provider 34 is a client data memory 37 in which planned routes, internet portal addresses and telephone numbers of a client are stored.

The route calculation unit 36 now has the appropriate data (for example, meeting time, meeting place and current traffic conditions) to calculate, on the basis of current map material, a route from the present location of the mobile telephone to the destination location. If calendar entries are provided for a later period, the route calculation unit can also determine the starting point and destination with the aid of the calendar entries and calculate a route from the starting point to the destination. But current traffic information is at this point in time not yet to be taken into consideration.

In addition to the route, which is transmitted for example by SMS (short message service) or by means of some other suitable data transmission technology to the mobile telephone via the interface 41, the service provider 34 has, by means of the route calculation unit 36, the option of estimating the travelling time for a calculated route. This travelling time information is conveyed both to the mobile telephone 23 via the interface 41 and to the internet portal 27.

The mobile telephone 23 then records this travelling time information in the local calendar 24, and the internet portal 27 records the travelling time information in the global calendar 29. As soon as a connection is made between PC 31 and internet portal 27, the local calendar 32 of the PC is then also updated.

When the current time gets near the previously estimated departure time which was stored in the calendars, the service provider can make a recalculation of the route or associated travelling time with the aid of the current traffic information filed in the memory 35. If a deviation from the original estimated travelling time is shown, the new travelling time is conveyed to the mobile telephone 23 and the internet portal 27 or the PC 31, so that the user in certain circumstances can commence his journey earlier to an appointment in case of adverse traffic and weather conditions.

If the altered traffic conditions also necessitate recalculation of the route, it is sensible for the service provider 34 to automatically convey the new route to the mobile telephone 23. In this respect it is also sensible for the service provider 34 first to file the calculated route in the client memory 37 and to transmit the final route to the user only immediately before starting the journey.

In this way a user always has the travelling times to his appointments under control and can plan his further appointments accordingly and record them in the calendars, taking the travelling times into account.

Finally it should also be noted that the telephone 23 can also, via the interface 41, make a route inquiry directly from the navigation device 26 to the service provider 34.

What is claimed is:

1. Electronic organiser (10) with a calendar (11) in which appointments at least according to date, time and an individual description are variable; and an interface (12) which can exchange data in respect of the appointment data bidirectionally with an interface (22) existing on a navigation system; wherein the data filed in the calendar (11) can be used in the navigation system to calculate the route and to estimate a traveling time for the calculated route; and wherein traveling time information is conveyed to the calendar (11) and is recorded therein.

2. Electronic organiser according to claim 1, characterised in that data exchange is bidirectional.

3. Electronic organiser according to claim 1, characterised in that the in the navigation system the data filed in the calendar (11) can be used to determine the route.

4. Electronic organiser according to claim 1, characterised in that the navigation system is a service provider.

5. Electronic organiser according to claim 1, characterised in that the navigation system is a personal computer.

6. Electronic organiser according to claim 1, characterised in that the navigation system is a mobile telephone.

7. Electronic organiser according to claim 1, characterised in that the electronic organizer and the navigation system can be connected via the internet.

8. Electronic organiser according to claim 1, characterised in that the electronic organizer and the navigation system can be connected via a wire-bound or air interface.

9. Electronic organiser according to claim 1, characterised in that there is a file (15) in which a destination location is deposited under the respective individual description and in that there is a matching assembly (20) which, with the aid of the individual description recorded in the calendar, ascertains the associated destination location from the file (15).

10. Electronic organiser according to claim 9, characterised in that the individual description is a name and/or a telephone number.

11. Electronic organiser according to claim 8, characterised in that it is housed together with the navigation system (21) in a unit.

12. Electronic organiser according to claim 11, characterised in that the unit is a mobile telephone.

13. A method for calculating a navigation route comprising:

storing appointments in a calendar function of an electronic organiser according to at least time, date and description;

exchanging data between the electronic organiser and a navigation system;

using data associated with appointments in the calendar function to determine at least a route and an estimated traveling time for the route; and transferring travel time information from the navigation system to the calendar function.

14. The method of claim 13 further comprising:

identifying a time that the navigation system is activated;

identifying one or more appointments that are within a predetermined time period of the activation of the navigation system; and presenting the one or more appointments within the predetermined time period to the user with a request if route information is required.

15. The method of claim 13 further comprising:

identifying a time of at least one appointment;

calculating a route to the appointment including an estimated travel time;

identifying any traffic delays along the calculated route; and rescheduling a departure time for the at least one appointment as a function of the traffic delay and identifying the rescheduled time to the user.

16. The method of claim 15 wherein traffic delay is identified as a function of traffic congestion, road hazard and repair and weather conditions.

17. The method of claim 15 further comprising adding a period of time as a safety margin to the departure time for the appointment.

18. The method of claim 14 further comprising identifying the one or more appointments as a function of a distance of the user from a location of a certain appointment.

19. The method of claim 13 further comprising:

determining a time of an appointment;

determining an estimated travel time to the appointment;

determining an anticipated start time for travel to the location of the appointment as a function or a current time and location of the user and the estimated travel time; and notifying the user of the anticipated start time if the anticipated start time is within a predetermined time period of the anticipated start time.

20. The method of claim 13 further comprising:

determining an estimated travel time to the at least one appointment from a current location of the user;

determining an estimated start time for travel to the at least one appointment as a function of the current location of the user and the estimated travel time; and updating the calendar function of the organizer to reflect the estimated start time.

* * * * *